United States Patent
Yang et al.

(10) Patent No.: US 10,397,907 B2
(45) Date of Patent: Aug. 27, 2019

(54) METHOD FOR ALLOCATING NETWORK RESOURCE, METHOD FOR CONNECTING TO TARGET DEVICE IN NETWORK, BASE STATION, AND TERMINAL DEVICE

(71) Applicant: HUAWEI TECHNOLOGIES CO., LTD., Shenzhen (CN)

(72) Inventors: Xiaodong Yang, Beijing (CN); Xuelong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 14/928,185

(22) Filed: Oct. 30, 2015

(65) Prior Publication Data
US 2016/0050650 A1 Feb. 18, 2016

Related U.S. Application Data

(63) Continuation of application No. PCT/CN2013/075143, filed on May 3, 2013.

(51) Int. Cl.
| | |
|---|---|
| *H04W 72/04* | (2009.01) |
| *H04B 7/155* | (2006.01) |
| *H04W 88/04* | (2009.01) |

(52) U.S. Cl.
CPC ...... *H04W 72/042* (2013.01); *H04B 7/15507* (2013.01); *H04W 72/04* (2013.01);
(Continued)

(58) Field of Classification Search
None
See application file for complete search history.

(56) References Cited

U.S. PATENT DOCUMENTS

| | | | |
|---|---|---|---|
| 2011/0134887 A1 | 6/2011 | Jeon et al. | |
| 2012/0106517 A1* | 5/2012 | Charbit | H04W 72/04 370/336 |

(Continued)

FOREIGN PATENT DOCUMENTS

| | | |
|---|---|---|
| CN | 102780993 | 11/2012 |
| CN | 103002578 | 3/2013 |
| WO | 2012/091418 A2 | 7/2012 |

OTHER PUBLICATIONS

International Search Report dated Feb. 20, 2014, in corresponding International Application No. PCT/CN2013/075143.
(Continued)

*Primary Examiner* — Robert M Morlan

(57) ABSTRACT

The present application discloses a method for allocating a network resource, a method for connecting to a target device in a network, a base station, and a terminal device. In the method for allocating a network resource, a base station receives request information sent by a first terminal device, where the request information is configured to request the base station to allocate a network resource; the base station sends, to the first terminal device, allocation information of the network resource allocated by the base station, where the allocation information is configured to indicate the network resource allocated by the base station; the first terminal device is a terminal served by a cell of the base station, and the second terminal device is a terminal that accesses the target device by using the first terminal device. Thus, a problem of network resource waste is reduced, and user experience is improved.

15 Claims, 7 Drawing Sheets

(52) U.S. Cl.
CPC ..... *H04W 72/044* (2013.01); *H04W 72/0413* (2013.01); *H04W 88/04* (2013.01)

(56) References Cited

U.S. PATENT DOCUMENTS

| | | | |
|---|---|---|---|
| 2013/0083779 A1 | 4/2013 | Ahn et al. | |
| 2013/0322388 A1 | 12/2013 | Ahn et al. | |
| 2014/0198708 A1* | 7/2014 | Lee | H04W 88/04 370/312 |
| 2015/0127733 A1* | 5/2015 | Ding | H04W 4/08 709/204 |
| 2015/0271856 A1* | 9/2015 | Tong | H04W 16/26 455/426.1 |
| 2015/0334757 A1* | 11/2015 | Seo | H04W 76/023 370/329 |

OTHER PUBLICATIONS

Extended European Search Report dated Mar. 17, 2016 in corresponding European Patent Application No. 13883779.4.

* cited by examiner

METHOD FOR ALLOCATING NETWORK RESOURCE, METHOD FOR CONNECTING TO TARGET DEVICE IN NETWORK, BASE STATION, AND TERMINAL DEVICE

CROSS-REFERENCE TO RELATED APPLICATIONS

This application is a continuation of International Application No. PCT/CN2013/075143, filed on May 3, 2013, which is hereby incorporated by reference in its entirety.

TECHNICAL FIELD

The present invention relates to the field of wireless communications technologies, and in particular, to a method for allocating a network resource, a method for connecting to a target device in a network, a base station, and a terminal device.

BACKGROUND

In a wireless communications network, if a terminal device cannot be served by a cell of a base station, for example, the terminal device is not located in signal coverage of the base station, the terminal device is located in a hole area of signal coverage of the base station, or a base station fault causes a failure in providing signal coverage for the terminal device, in these cases, the terminal device may access, by using a terminal device served by a cell of the base station or another base station, a target device in a network to perform data transmission. Such a terminal device that is served by the cell of the base station or the another base station is referred to as cell function user equipment (CF UE), and such a terminal device that accesses the target device in the network by using the CF UE is referred to as access user equipment (AC UE). In a device to device (D2D) protocol, an AC UE may discover a CF UE by detecting a channel of another terminal device. However, in the D2D protocol, terminal devices use their capabilities to contend for network resources, and a terminal device with a stronger capability occupies more network resources or preferentially occupies a network resource. However, it is possible that the CF UE that can provide a service of accessing a network for the AC UE cannot obtain enough network resources, which causes a case in which the AC UE cannot discover the CF UE or the AC UE discovers the CF UE but cannot access the target device in the network. For example, a CF UE that is far from the AC UE occupies a large quantity of network resources by contention, the AC UE cannot detect the CF UE due to a long distance, and a CF UE that is closer to the AC UE cannot provide a service for the AC UE either, due to a failure in acquiring enough network resources, and resource waste is caused and user experience of the AC UE is degraded.

SUMMARY

In view of the foregoing technical problem, embodiments of the present invention provide a method for allocating a network resource, a method for connecting to a target device in a network, a base station, and a terminal device.

According to a first aspect, an embodiment of the present invention provides a method for allocating a network resource, including:

receiving, by a base station, request information sent by a first terminal device, where the request information is configured to request the base station to allocate a network resource, and the network resource allocated by the base station is used by a second terminal device to access a target device by using the first terminal device; and sending, by the base station to the first terminal device, allocation information of the network resource allocated by the base station, where the allocation information is configured to indicate the network resource allocated by the base station; where the first terminal device is a terminal served by a cell of the base station, and the second terminal device is a terminal that utilizes the first terminal device to access the target device.

With reference to the first aspect, in a first possible implementation manner of the first aspect, the sending, by the base station to the first terminal device, allocation information of the network resource allocated by the base station includes:

sending, by the base station to the first terminal device by using signaling or by broadcasting, the allocation information of the network resource allocated by the base station.

With reference to the first aspect or the first possible implementation manner of the first aspect, in a second possible implementation manner, the network resource allocated by the base station includes a timeslot, a frequency, or a code channel used in a case in which the second terminal device accesses the target device by using the first terminal device.

With reference to any one of the first aspect to the second possible implementation manner of the first aspect, in a third possible implementation manner, the method further includes:

determining, by the base station, a correspondence between a channel and the network resource according to the network resource allocated by the base station, where the correspondence is configured to indicate a network resource used by a synchronization channel, a broadcast channel, or an access channel; and sending, by the base station, the correspondence to the first terminal device.

According to a second aspect, an embodiment of the present invention provides a method for allocating a network resource, including:

sending, by a first terminal device, request information to a base station, where the request information is configured to request the base station to allocate a network resource, and the network resource allocated by the base station is used by a second terminal device to access a target device by using the first terminal device; and receiving, by the first terminal device, allocation information of the network resource sent by the base station, where the allocation information is configured to indicate the network resource allocated by the base station when the second terminal device accesses the target device by using the first terminal device; where the first terminal device is a terminal served by a cell of the base station, and the second terminal device is a terminal that utilizes the first terminal device to access the target device.

With reference to the second aspect, in a first possible implementation manner of the second aspect, the allocation information of the network resource allocated by the base station is sent by the base station to the first terminal device by using signaling or by broadcasting.

With reference to the second aspect, in a second possible implementation manner of the second aspect, the method further includes:

receiving, by the first terminal device, a correspondence that is between a channel and the network resource and is determined according to the network resource allocated by the base station, where the correspondence is configured to indicate a network resource used by a synchronization channel, a broadcast channel, or an access channel; and connecting, by the first terminal device, the second terminal device to the target device according to the correspondence.

With reference to any one of the second aspect to the second possible implementation manner of the second aspect, in a third possible implementation manner of the second aspect, the network resource allocated by the base station includes a timeslot, a frequency, or a code channel used in a case in which the second terminal device accesses the target device by using the first terminal device.

According to a third aspect, an embodiment of the present invention provides a base station, including:

a receiving unit, configured to receive request information sent by a first terminal device, where the request information is configured to request the base station to allocate a network resource, and the network resource allocated by the base station is used by a second terminal device to access a target device by using the first terminal device; and a first sending unit, configured to send, to the first terminal device, allocation information of the network resource allocated by the base station, where the allocation information is configured to indicate the network resource allocated by the base station; where the first terminal device is a terminal served by a cell of the base station, and the second terminal device is a terminal that utilizes the first terminal device to access the target device.

With reference to the third aspect, in a first possible implementation manner of the third aspect, the sending unit is specifically configured to send the allocation information of the network resource to the first terminal device by using signaling or by broadcasting.

With reference to the third aspect or the first possible implementation manner of the third aspect, in a second possible implementation manner, the network resource allocated by the base station includes a timeslot, a frequency, or a code channel used in a case in which the second terminal device accesses the target device by using the first terminal device.

With reference to any one of the third aspect to the second possible implementation manner of the third aspect, in a third possible implementation manner, the base station further includes:

a determining unit, configured to determine a correspondence between a channel and the network resource according to the network resource allocated by the base station, where the correspondence is configured to indicate a subframe used by a synchronization channel, a broadcast channel, or an access channel; and a second sending unit, configured to send the correspondence that is between the channel and the network resource and is determined by the determining unit to the first terminal device.

According to a fourth aspect, an embodiment of the present invention provides a first terminal device, including:

a sending unit, configured to send request information to a base station, where the request information is configured to request the base station to allocate a network resource, and the network resource allocated by the base station is used by a second terminal device to access a target device by using the first terminal device; and a first receiving unit, configured to receive allocation information of the network resource sent by the base station, where the allocation information is configured to indicate the network resource allocated by the base station; where the first terminal device is a terminal served by a cell of the base station, and the second terminal device is a terminal that utilizes the first terminal device to access the target device.

With reference to the fourth aspect, in a first possible implementation manner of the fourth aspect, the allocation information is sent by the base station to the first terminal device by using signaling or by broadcasting.

With reference to the fourth aspect or the first possible implementation manner of the fourth aspect, in a second possible implementation manner of the fourth aspect, the first terminal device further includes:

a second receiving unit, configured to receive a correspondence that is between a channel and the network resource and is determined according to the network resource allocated by the base station, where the correspondence is configured to indicate a subframe used by a synchronization channel, a broadcast channel, or an access channel; and an access unit, configured to enable the second terminal device to access the target device according to the correspondence.

According to a fifth aspect, an embodiment of the present invention provides a method for connecting to a target device in a network, where the method includes:

determining, by a second terminal device, a network resource used by a first terminal device, where the network resource is used by the second terminal device to access a target device by using the first terminal device, and the network resource is allocated by a base station; and connecting to, by the second terminal device, the target device according to the network resource by using the first terminal device; where the first terminal device is a terminal served by a cell of the base station, and the second terminal device is a terminal that utilizes the first terminal device to access the target device.

With reference to the fifth aspect, in a first possible implementation manner of the fifth aspect, the connecting to, by the second terminal device, the target device according to the network resource by using the first terminal device includes:

determining, by the second terminal device, a correspondence between a channel and the network resource according to the network resource, where the correspondence is configured to indicate a network resource used by a synchronization channel, a broadcast channel, or an access channel; and connecting to, by the second terminal device, the target device according to the correspondence by using the first terminal device.

According to a sixth aspect, an embodiment of the present invention provides a second terminal device, including:

a determining unit, configured to determine a network resource used by a first terminal device, where the network resource is used by the second terminal device to access a target device by using the first terminal device, and the network resource is allocated by a base station;

an access unit, configured to enable the second terminal device to access the target device in a network according to the network resource by using the first terminal device; where the first terminal device is a terminal of a serving cell of the base station, and the second terminal device is a terminal that utilizes the first terminal device to access the target device.

With reference to the sixth aspect, in a first possible implementation manner of the sixth aspect, the access unit is specifically configured to determine a correspondence between a channel and the network resource according to the network resource, where the correspondence is configured to indicate a subframe used by a synchronization channel, a broadcast channel, or an access channel; the second terminal device accesses the target device according to the correspondence by using the first terminal device.

In the used technical solutions provided in the embodiments of the present invention, a base station allocates, for a first terminal device, a network resource used by the first terminal device in a case in which a second terminal device accesses a target device in a network by using the first terminal device, so as to resolve a problem that the first terminal device may not have enough network resources to provide a service for the second terminal device caused by acquiring of a network resource by using a contention mechanism. Network resources are reduced and user experience of the second terminal device is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
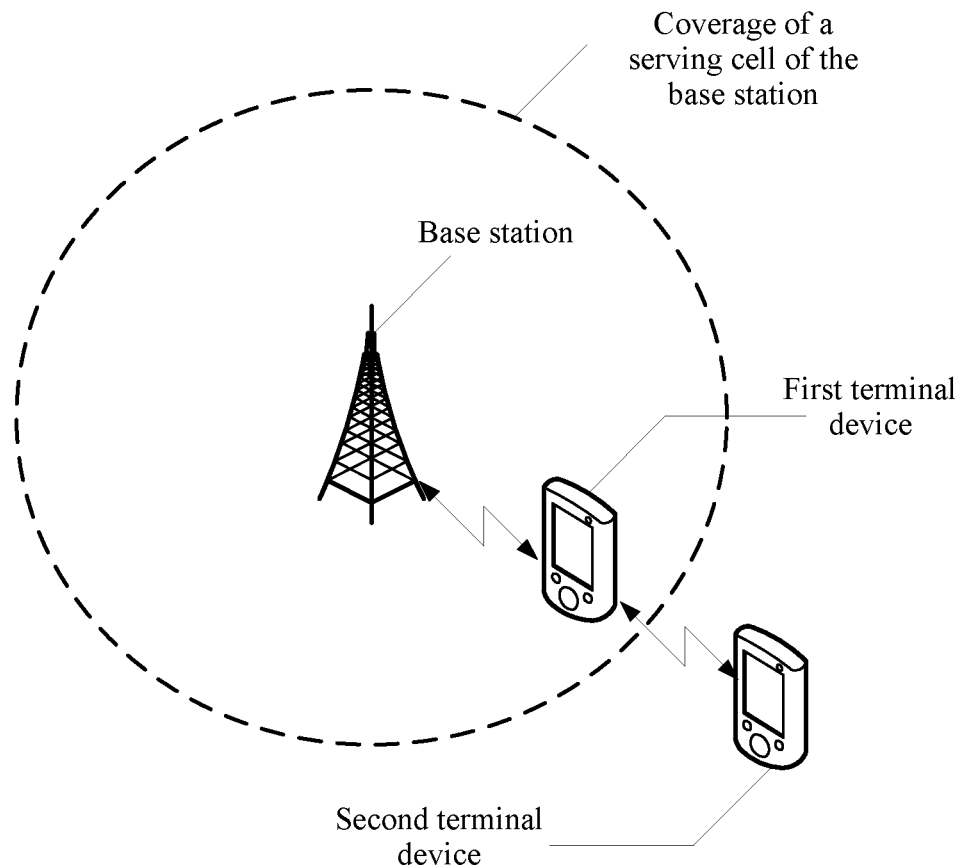
FIG. 1 is a schematic diagram of an architecture of a communications system applied in an embodiment of the present invention.

FIG. 1 is a schematic diagram of an architecture of a communications system applied in an embodiment of the present invention, where the communications system includes: a base station, a first terminal device, and a second terminal device that accesses a network by using the first terminal device.

A typical application scenario of this embodiment of the present invention is: the second terminal device may be located outside coverage of a serving cell of the base station, or may be located in a coverage hole of the coverage of the serving cell of the base station. In short, the second terminal device cannot directly receive a radio wave sent by the base station and access a target device in a network by using the radio wave and interaction with the base station. Further, this embodiment of the present invention may further be used in any scenario in which a second terminal device utilizes a first terminal device to access a network. For example, because there is a requirement of an emergency service and a base station that provides a service for the second terminal device cannot meet the requirement of the emergency service, the second terminal device may not access the base station that serves the second terminal device, but access, by using the first terminal device, a base station that serves the first terminal device.

The technical solution provided in this embodiment of the present invention may be applied to various communications systems, such as: the Global System for Mobile Communications (GSM), a Code Division Multiple Access (CDMA) system, a Wideband Code Division Multiple Access (WCDMA) system, a general packet radio service (GPRS) system, and a Long Term Evolution (LTE,) system.

A terminal device in this embodiment of the present invention may also be referred to as a mobile terminal, user equipment (UE), mobile user equipment, or the like. The terminal device may communicate with one or more core networks by using a radio access network (RAN). The UE may be a mobile terminal, such as a mobile phone (or referred to as a "cellular" phone) and a computer with a mobile terminal For example, the user equipment may be a portable, pocket-sized, handheld, computer built-in, or in-vehicle mobile apparatus, which exchanges language and/or data with the radio access network.

A base station in this embodiment of the present invention may be a base transceiver station (BTS) in GSM or CDMA, a NodeB in WCDMA, an evolved NodeB (eNB or e-NodeB) in LTE, a small-cell base station corresponding to a small cell, various access points (AP), or the like, which is not limited in the present invention.

Figure 2:
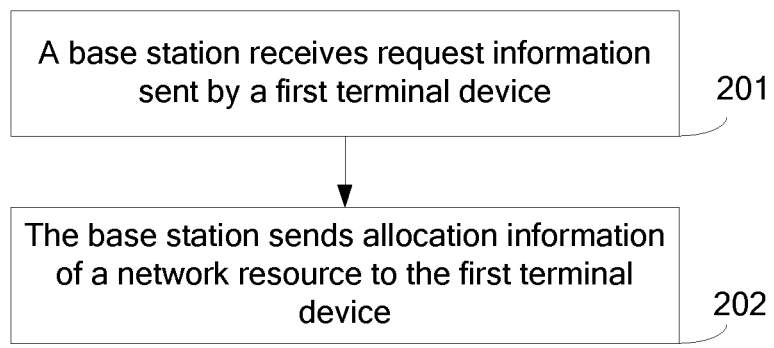
FIG. 2 is a schematic flowchart of a method for allocating a network resource according to an embodiment of the present invention.

In view of the foregoing scenario, in one aspect, an embodiment of the present invention provides a method for allocating a network resource, and a schematic flowchart that is shown in FIG. 2 and is of the method for allocating a network resource includes the following content:

201. A base station receives request information sent by a first terminal device, where the request information is configured to request the base station to allocate a network resource. Optionally, the network resource may include a timeslot resource, a frequency resource, or a code channel resource.

The network resource allocated by the base station is used by a second terminal device to access a target device by using the first terminal device. Optionally, the target device may be the base station to which the first terminal device sends the request information, or may be a neighboring base station of the base station, or the target device may be the first terminal device, or the target device may be any communications device in a cell in which the first terminal device is located.

In a process in which the base station allocates the network resource, the network resource allocated by the base station may be a timeslot, a frequency, or a code channel that is specified by the base station and is used in a case in which the second terminal device accesses the target device by using the first terminal device, or the network resource allocated by the base station may be information that is received by the base station from a network management system or the neighboring base station of the base station and is configured to indicate a timeslot, a frequency, or a code channel used in a case in which the second terminal device accesses the target device by using the first terminal device. To avoid a conflict between network resources occupied by terminals served by a cell of the base station, in the process in which the base station allocates the network resource, the base station may determine whether a timeslot, a frequency, or a code channel in the network resource that is allocated to the first terminal device has been occupied by another terminal device, and if the timeslot, the frequency, or the code channel has been occupied by the another terminal device, the base station selects a network resource allocated to the first terminal device from an idle network resource.

202. The base station sends, to the first terminal device, allocation information of the network resource allocated by the base station.

The allocation information is configured to indicate the network resource allocated by the base station.

The network resource allocated by the base station may be notified by the base station to the first terminal device by using the allocation information of the network resource, and the first terminal device determines, according to the allocation information of the network resource allocated by the base station, a specific timeslot, a specific frequency, or a specific code channel in which the first terminal device assists the second terminal device in connecting to the target device.

In this embodiment of the present invention, the first terminal device is a terminal served by a cell of the base station, and the second terminal device is a terminal that utilizes the first terminal device to access the target device. The second terminal device may be the terminal served by the cell of the base station, or may not be the terminal served by the cell of the base station (for example, the second terminal device is a terminal served by a cell of another base station, or the second terminal device is not a terminal served by a cell of any base station). The second terminal device in this embodiment of the present invention may be any terminal that utilizes the first terminal device to access the target device.

Optionally, the network resource allocated by the base station includes a timeslot, a frequency, or a code channel used in a case in which the second terminal device utilizes the first terminal device to access the target device.

Optionally, the foregoing method further includes: determining, by the base station, a correspondence between a channel and the network resource according to the network resource allocated by the base station, where the correspondence is configured to indicate a network resource used by a synchronization channel, a broadcast channel, or an access channel; and sending, by the base station, the correspondence to the first terminal device.

Optionally, in order not to change resource utilization and scheduling of a base station in a wireless communications system, the network resource allocated by the base station may be a timeslot, a frequency, or a code channel used by the first terminal device to perform a normal communication service in a cell of the base station. For example, a resource block (RB) is a typical timeslot resource and frequency resource in an LTE system; the network resource allocated by the base station may be an RB used by the first terminal device to access the base station, and the second terminal device may communicate with the base station by using an RB the same as the RB used by the first terminal device to access the base station.

A person skilled in the art may understand that, the network resource allocated by the base station is an idle network resource and includes a resource that can be used by the first terminal device and enables the second terminal device to access the target device in a network.

Optionally, the base station may send the allocation information of the network resource to the first terminal device by using signaling or by broadcasting.

In a possible implementation manner, the base station may directly broadcast the allocation information of the network resource within the cell of the base station, instead of sending the allocation information of the network resource to the first terminal resource after the first terminal device requests the base station to allocate the network resource. In this case, step 201 is not necessary. The first terminal device receives the allocation information from the broadcast and determines, according to the allocation information, a network resource that enables the second terminal device to access the target device in the network.

As an example, the first terminal device is a CF UE, and the second terminal device is an AC UE. In a case in which the CF UE assists the AC UE in connecting to a target device in a network, the CF UE requests the base station to allocate a network resource, the base station allocates the network resource to the CF UE, and the CF UE determines, by receiving allocation information of the network resource sent by the base station, a timeslot resource, a frequency resource (for example, a frequency used in an uplink or downlink channel), or a code channel resource used in the case in which the CF UE assists the AC UE in connecting to the target device in the network. The CF UE may receive a correspondence between a channel and a network resource from the base station and read from the correspondence that in which timeslot, at which frequency, or in which code channel an SCH (Synchronization Channel), a BCH (Broadcast Channel), or a RACH (Random Access Channel) is used. The AC UE searches for, by monitoring a subframe (a subframe is comprised of timeslots, for example, one subframe is comprised of at least two timeslots), a frequency or a code channel used in the case in which the CF UE assists the AC UE in connecting to the target device in the network.

For example, the AC UE searches a whole spectrum or all code channels. If the AC UE detects an SCH by using a subframe, a frequency, or a code channel, the AC UE uses the SCH to perform channel synchronization with the CF UE in the subframe, at the frequency, or in the code channel; after the AC UE completes the channel synchronization, the AC UE may detect a BCH corresponding to a network resource used by the CF UE, and the AC UE reads, from the BCH corresponding to the network resource used by the CF UE, identification information used to indicate a RACH corresponding to the network resource used by the CF UE; the AC UE may determine, according to the identification information, a RACH used by the CF UE and access the target device in the network by using the RACH used by the CF UE.

As an example, the first terminal device and the second terminal device are terminals served by a cell of a same base station; the first terminal device is a multimedia server, and the second terminal device is a mobile phone held by a user. To obtain better user experience when the user uses the second terminal device to watch or listen to a multimedia service, the second terminal device may not transmit the multimedia service to the first terminal device by using the base station, but needs to establish the transmission of the multimedia service by directly using the first terminal device. In this case, the first terminal device is the target device, and the first terminal device may request the base station to allocate a network resource that is used by the second terminal device to access the first terminal device by using the first terminal device, so that the first terminal device and the second terminal device may establish a multimedia service and do not require the base station to transfer the multimedia service.

As an example, the first terminal device is a terminal served by a cell of a base station, and the second terminal device is not a terminal served by the cell of the base station. For example, the second terminal device is extremely far from the base station, which causes that the second terminal device cannot receive a radio signal transmitted by the base station, and a communication service cannot be performed. If the second terminal device needs to perform a communication service and can discover the first terminal device, the second terminal device can access the base station or a neighboring base station of the base station by using the first terminal device and initiate a service. The first terminal device may request the base station to allocate a network resource used by the second terminal device to access the base station or the neighboring base station of the base station. In this case, the target device is the base station or the neighboring base station of the base station. For the second terminal device, a function of the first terminal device is similar to a "relay" or a "remote antenna" of the second terminal device.

In the prior art, a CF UE uses its capability to acquire, in a contention manner, a network resource that is configured to assist an AC UE in connecting to a target device in a network. In a manner in which the CF UE uses its capability to acquire the network resource in the contention manner, because not all network resources are scheduled and allocated by a base station, a network resource occupied by different CF UEs by using their capabilities may actually not be available and idle, and the CF UEs cannot assist the AC UE in accessing the network or cannot occupy enough network resources to serve a second terminal device due to their relatively weak capabilities. In the used technical solution provided in this embodiment of the present invention, the base station allocates, to a first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available and idle, and which network resource can more efficiently assist the second terminal device in accessing the network. Therefore, a problem that a network resource is not properly used due to that the network resource is occupied by the CF UE by contention is avoided. Network resources are reduced and user experience of the second terminal device is improved.

Figure 3A:
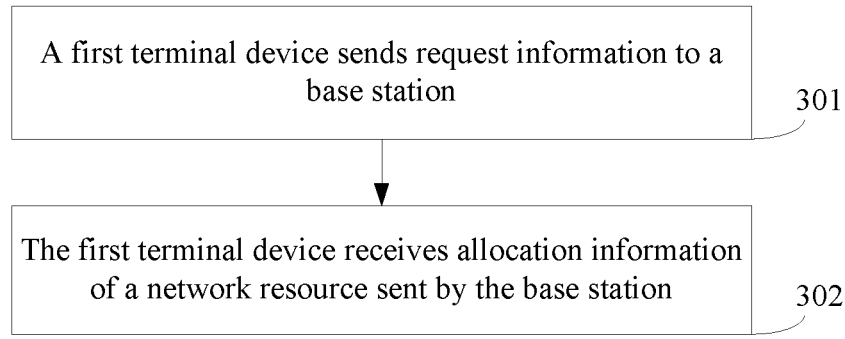
FIG. 3a is a schematic flowchart of a method for allocating a network resource according to an embodiment of the present invention.

Another aspect of embodiments of the present invention further provides a method for allocating a network resource, where the method is a detailed description of an action executed by a first terminal device in the method embodiment shown in FIG. 2, and a concept and a process in the method embodiment shown in FIG. 2 are also applicable to this embodiment. FIG. 3*a* is a schematic flowchart of the method for allocating a network resource shown in this embodiment, including the following content:

301. A first terminal device sends request information to a base station, where the request information is configured to request the base station to allocate a network resource, and the network resource allocated by the base station is used by a second terminal device to access a target device by using the first terminal device. Optionally, the network resource includes a timeslot resource, a frequency resource, and/or a code channel resource.

302. The first terminal device receives allocation information of the network resource sent by the base station, where the allocation information is configured to indicate the network resource allocated by the base station.

In this embodiment, the first terminal device is a terminal served by a cell of the base station, and the second terminal device is a terminal that utilizes the first terminal device to access the target device in a network.

As an example, in such a case in which the second terminal device is located in a signal coverage hole area of a serving cell of a base station or on an edge of signal coverage of the base station, the second terminal device cannot directly communicate with the base station to access the target device in the network, and the second terminal device needs to communicate with another terminal device served by the cell of the base station, so as to access the target device in the network. For example, the second terminal device may request for, in a broadcast manner, a terminal device that can provide the second terminal device with a service of connecting to the target device in the network. If the first terminal device receives a request of the second terminal device and determines, according to factors such as a location in which the first terminal device is currently located or urgency of a current service of the second terminal device, that the service of connecting to the target device in the network can be provided for the second terminal device, the first terminal device requests the base station to allocate a network resource that is used by the second terminal device to access the target device in the network by using the first terminal device. After the first terminal device determines, according to the allocation information of the network resource received from the base station, the network resource allocated by the base station, the first terminal device may send the allocation information of the network resource and an identifier of the first terminal device to the second terminal device, so that the second terminal device can learn that the network resource is a network resource that is allocated by the base station to the first terminal device, and is used by the first terminal device in a case in which the first terminal device assists the second terminal device in connecting to the target device in the network, and the second terminal device accesses the network according to the network device by using the first terminal device. As another example, a network (such as a network management system or a base station) may specify the first terminal device as a terminal (that is, a CF UE) of a serving cell of the base station that provides the second terminal device with a service of connecting to the target device in the network. The first terminal device requests the base station to allocate a network resource, where the network resource is used by the second terminal device to access the target device in the network by using the first terminal device. Optionally, if the base station can learn in advance that the first terminal device is the CF UE that provides the second terminal device with the service of connecting to the target device in the network, the base station may also directly send, to the first terminal device, the network resource allocated by the base station, instead of allocating a network resource to the first terminal device after the first terminal device requests the base station to allocate a network resource. After the first terminal device determines the network resource allocated by the base station, the second terminal device searches for the network resource allocated by the base station in a timeslot, at a frequency, or in a code channel, and when finding the network resource, the second terminal device accesses the target device in the network according to the network resource by using the first terminal device.

Optionally, the method for allocating a network resource may further include:

receiving, by the first terminal device, a correspondence that is between a channel and the network resource allocated by the base station and is sent by the base station, where the correspondence is configured to indicate a network resource used by a synchronization channel, a broadcast channel, or an access channel; and connecting, by the first terminal device, the second terminal device to the target device according to the correspondence.

For example, the first terminal device determines, according to the allocation information of the network resource allocated by the base station, that frequency resources allocated by the base station are two frequency bands: 890 MHz to 915 MHz and 890 MHz to 909 MHz. The first terminal device may further determine, according to the correspondence between the channel and the network resource, that the frequency resources allocated by the base station are 890 MHz to 915 MHz used to transmit a synchronization channel and 890 MHz to 909 MHz used to transmit an access channel. Used as the CF UE, the first terminal device uses a synchronization channel and a broadcast channel at 890 MHz to 915 MHz, uses an access channel at 890 MHz to 909 MHz, and broadcasts, in the broadcast channel, indication information used to indicate that a frequency band in which an access channel is used is 890 MHz to 909 MHz. Used as an AC UE, the second terminal device may determine, by searching a whole wireless frequency band, that the first terminal device uses a synchronization channel and a broadcast channel at 890 MHz to 915 MHz; after channel synchronization is performed, reads the indication information broadcasted by the first terminal device in the broadcast channel; and determines, according to the indication information, that a frequency band in which the first terminal device uses an access channel is 890 MHz to 909 MHz. The second terminal device initiates access by using an access channel at 890 MHz to 909 MHz and access the target device in the network by using the first terminal device.

For another example, the first terminal device determines, according to the allocation information of the network resource, that the network resource allocated by the base station is a code channel 1 and a code channel 2; the first terminal device uses a synchronization channel and a broadcast channel in the code channel 1 and uses an access channel in the code channel 2, and the first terminal device broadcasts, in the broadcast channel, indication information used to indicate that the first terminal device uses an access channel in the code channel 2. By searching all code channels, the second terminal device determines that the first terminal device uses a synchronization channel and a broadcast channel in the code channel 1; after performing channel synchronization by using the synchronization channel, the second terminal device reads the indication information broadcasted in the broadcast channel and determines, according to the indication information, that the first terminal device uses an access channel in the code channel 2; the second terminal device initiates, by using the access channel in the code channel 2, an access process to access the target device in the network.

Optionally, the allocation information of the network resource received by the first terminal device is sent by the base station to the first terminal device by using signaling or by broadcasting.

For example, when the first terminal device requests the base station to allocate a network resource, the base station may encapsulate allocation information of the network resource in RRC signaling and send the RRC signaling to the first terminal device. The base station may also broadcast the allocation information of the network resource in a serving cell of the base station, and the first terminal device may acquire the allocation information of the network resource from the broadcast.

Figure 3B:
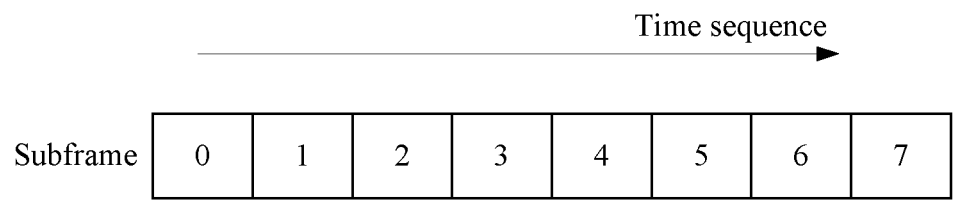
FIG. 3b is a schematic diagram of network resource allocation according to an embodiment of the present invention.

For example, in a schematic diagram of network resource allocation shown in FIG. 3b, a base station allocates a network resource to a first terminal device, and the first terminal device may determine, according to allocation information of the network resource sent by the base station, that the network resource is subframes 2, 3, and 6 and determines, according to a correspondence that is sent by the base station and is between a channel and a subframe, that in a case in which the second terminal device accesses the target device by using the first terminal device, the first terminal device uses a synchronization channel in the subframe 2, uses a broadcast channel in the subframe 3, and uses an access channel in the subframe 6. The first terminal device may broadcast, in the broadcast channel used by the subframe 3, indication information used to indicate that the first terminal device uses an access channel in the subframe 6. By searching various subframes, the second terminal device determines that the first terminal device uses a synchronization channel and performs channel synchronization in the subframe 2, determines that the first terminal device uses a broadcast channel in the subframe 3, and learns from the broadcast channel that the first terminal device uses an access channel in the subframe 6. The second terminal device accesses the target device in the network by using the access channel in the subframe 6 and the first terminal device.

In the prior art, a CF UE uses its capability to acquire, in a contention manner, a network resource that is configured to assist an AC UE in connecting to a target device in a network. Because not all network resources are scheduled and allocated by a base station, it is possible that a network resource occupied by the CF UE cannot assist the AC UE in accessing the network or the CF UE cannot occupy enough network resources to serve a second terminal device due to a relatively weak capability of the CF UE. In the used technical solution provided in this embodiment of the present invention, the base station allocates, to a first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available, and which network resource can more efficiently assist the second terminal device in accessing the network. Therefore, a problem of resource waste caused by that a network resource is occupied by the CF UE by contention is avoided. Network resources are reduced and user experience of the second terminal device is improved.

Figure 4:
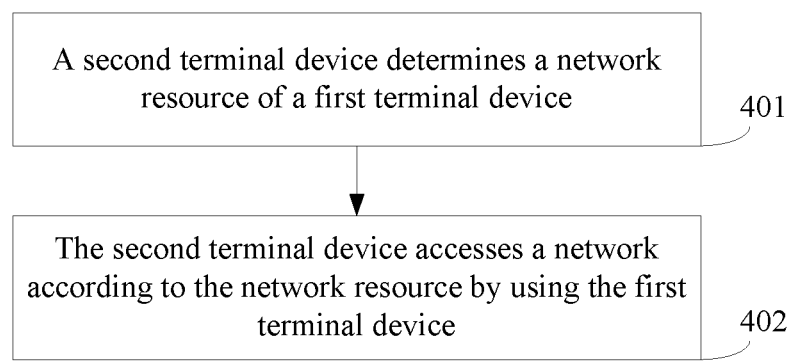
FIG. 4 is a schematic flowchart of a method for connecting to a target device in a network according to an embodiment of the present invention.

One aspect of embodiments of the present invention further provides a method for connecting to a target device in a network, where the method is a further extension of a method embodiment shown in FIG. 2 or FIG. 3. A concept and a process in the embodiment shown in FIG. 2 or FIG. 3 is still applicable to this embodiment. FIG. 4 shows a schematic flowchart of a method for connecting to a target device in a network, where the method includes the following content:

401. A second terminal device determines a network resource used by a first terminal device, where the network resource is used by the second terminal device to access a target device by using the first terminal device, and the network resource is allocated by a base station. The first terminal device is a terminal of a serving cell of the base station, and the second terminal device is a terminal that utilizes the first terminal device to access the target device in a network.

As an example, the first terminal device may broadcast allocation information of the network resource used by the first terminal device. If the second terminal device utilizes the first terminal device to access the target device in a network, the second terminal device may read the allocation information of the network resource from the broadcast, so as to determine the network resource used by the first terminal device.

As an example, the second terminal device may search all timeslot resources, frequency resources, or code channel resources. If the second terminal device can access the target device in the network in a timeslot, at a frequency, or in a code channel by using the first terminal device, the timeslot, the frequency, or the code channel is the network resource used by the first terminal device.

402. The second terminal device accesses the target device according to the network resource by using the first terminal device.

Optionally, that the second terminal device accesses the target device according to the network resource by using the first terminal device includes:

the second terminal device determines a correspondence between a channel and the network resource according to the network resource used by the first terminal device, where the correspondence is configured to indicate a network resource used by a synchronization channel, a broadcast channel, or an access channel; the second terminal device accesses the target device according to the correspondence between the channel and the network resource by using the first terminal device.

As an example, after the second terminal device determines a timeslot resource, a frequency resource, or a code channel resource that is used by the first terminal device to assist the second terminal device in connecting to the target device, the second terminal device may further perform detection on the timeslot resource, the frequency resource, or the code channel resource; determine a correspondence between a channel and the timeslot resource, the frequency resource, or the code channel resource; establish a connection to the first terminal device according to the correspondence; and access the target device in the network by using the first terminal device. The second terminal device may access the target device according to the correspondence by using the first terminal device.

In the prior art, a CF UE uses its capability to acquire, in a contention manner, a network resource that is configured to assist an AC UE in connecting to a target device in a network. Because not all network resources are scheduled and allocated by a base station, it is possible that a network resource occupied by the CF UE cannot assist the AC UE in accessing the network or the CF UE cannot occupy enough network resources to serve a second terminal device due to a relatively weak capability of the CF UE. In the used technical solution provided in this embodiment of the present invention, the base station allocates, to a first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available, and which network resource can more efficiently assist the second terminal device in accessing the network. Therefore, a problem of resource waste caused by that a network resource is occupied by the CF UE by contention is avoided. Network resources are reduced and user experience of the second terminal device is improved.

Figure 5:
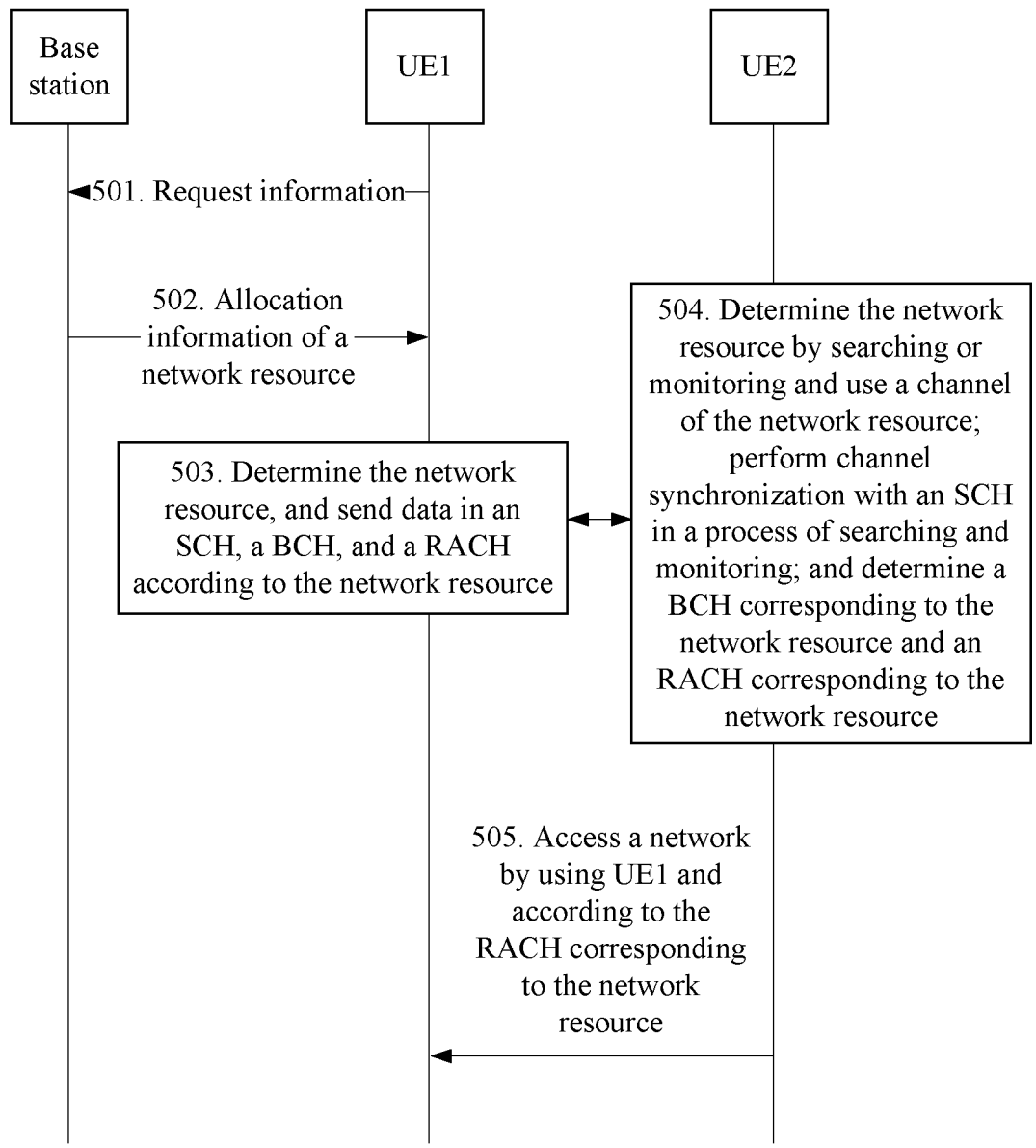
FIG. 5 is a schematic diagram of system interaction of a method for connecting to a target device in a network according to an embodiment of the present invention.

An embodiment of the present invention further provides a schematic diagram, shown in FIG. 5, of system interaction of a method for connecting to a target device in a network. In this embodiment, a first terminal device is CF UE, and a second terminal device is AC UE. This embodiment includes the following content:

501. In a case in which the first terminal device (UE1) is determined as the CF UE and is required to provide a network resource that is used by the second terminal device (UE2) to access a target device in a network, the first terminal device sends request information to a base station, where the request information is configured to request the base station to allocate the network resource, and the network resource allocated by the base station is used by the second terminal device to access the target device by using the first terminal device. Optionally, the network resource includes a timeslot resource, a frequency resource, and/or a code channel resource.

502. The base station sends allocation information of the network resource to the first terminal device by using a broadcast or RRC signaling. Certainly, the base station may also send the allocation information of the network resource to the first terminal device by using another manner. Optionally, if the base station learns in advance that the second terminal device is to access the target device in the network by using the first terminal device, the base station may directly send the allocation information of the network resource to the first terminal device by using the broadcast or the signaling, instead of allocating the network resource by the base station to the first terminal device after the first terminal device requests the base station to allocate a network resource. In this case, step 501 is optional.

503. The first terminal device determines, according to the received allocation information of the network resource, the network resource allocated by the base station such as a timeslot, a frequency, or a code channel, and sends data in channels such as an SCH, a BCH, and an RACH according to the network resource, where the data may include synchronization data sent in the SCH by the first terminal device according to the network resource, broadcast data sent in the BCH by the first terminal device according to the network resource, and indication information that is included in the broadcast data and is configured to indicate the RACH corresponding to the first terminal device according to the network resource.

504. The second terminal device determines the network resource by searching or monitoring, determines a correspondence between a channel and the network resource in a searching or monitoring process according to the network resource, performs channel synchronization with an SCH of the first terminal device according to the correspondence between the channel and the network resource, determines a BCH corresponding to the network resource used by the first terminal device, and reads, from the BCH, an RACH corresponding to the network resource that is used.

505. The second terminal device accesses the target device by using the first terminal device and according to the RACH corresponding to the network resource.

In the prior art, a CF UE uses its capability to acquire, in a contention manner, a network resource that is configured to assist an AC UE in connecting to a target device in a network. Because not all network resources are scheduled and allocated by a base station, it is possible that a network resource occupied by the CF UE cannot assist the AC UE in accessing the network or the CF UE cannot occupy enough network resources to serve a second terminal device due to a relatively weak capability of the CF UE. In the used technical solution provided in this embodiment of the present invention, the base station allocates, to a first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available, and which network resource can more efficiently assist the second terminal device in accessing the network. Therefore, a problem of resource waste caused by that a network resource is occupied by the CF UE by contention is avoided. Network resources are reduced and user experience of the second terminal device is improved.

Figure 6:
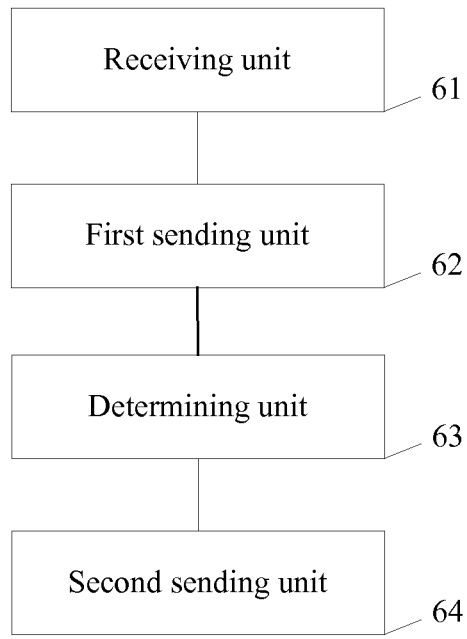
FIG. 6 is a schematic structural diagram of a base station according to an embodiment of the present invention.

In still another aspect, an embodiment of the present invention provides a base station, where the base station may be a base station in any one of the method embodiments shown in FIGS. 2 to 5. FIG. 6 shows a schematic structural diagram of the base station according to this embodiment of the present invention, where the base station includes:

a receiving unit 61, configured to receive request information sent by a first terminal device, where the request information is configured to request the base station to allocate a network resource, the network resource allocated by the base station is used by a second terminal device to access a target device by using the first terminal device, and optionally, the network resource includes a timeslot resource, a frequency resource, and/or a code channel resource; and a first sending unit 62, configured to send allocation information of the network resource to the first terminal device, where the allocation information is configured to indicate the network resource allocated by the base station.

In this embodiment, the first terminal device is a terminal of a serving cell of the base station, and the second terminal device is a terminal that utilizes the first terminal device to access the target device.

Optionally, the first sending unit 62 is specifically configured to send the allocation information of the network resource to the first terminal device by using signaling or by broadcasting.

Optionally, the network resource allocated by the base station includes a timeslot, a frequency, or a code channel used in a case in which the second terminal device accesses the target device by using the first terminal device.

Optionally, the base station further includes:

a determining unit 63, configured to determine a correspondence between a channel and the network resource according to the network resource allocated by the base station, where the correspondence is configured to indicate a network resource used by a synchronization channel, a broadcast channel, or an access channel; and a second sending unit 64, configured to send the correspondence that is between the channel and the network resource and is determined by the determining unit 63 to the first terminal device.

In this embodiment, the first sending unit 62 and the second sending unit 64 may be integrated to be used as a transmitter of the base station. The determining unit 63 may be a processor of the base station, and the receiving unit 61 may be a receiver of the base station.

Figure 7:
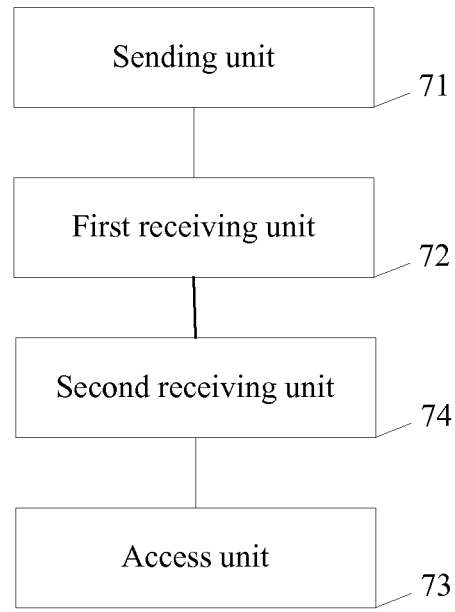
FIG. 7 is a schematic structural diagram of a first terminal device according to an embodiment of the present invention.

In still another aspect, an embodiment of the present invention provides a first terminal device, where the first terminal device may be a first terminal device in any one of the method embodiments shown in FIG. 2 to FIG. 5. FIG. 7 shows a schematic structural diagram of the first terminal device, where the first terminal device includes:

a sending unit 71, configured to send request information to a base station, where the request information is configured to request the base station to allocate a network resource, the network resource is used by a second terminal device to access a target device by using the first terminal device, and optionally, the network resource includes a timeslot resource, a frequency resource, and/or a code channel resource; and a first receiving unit 72, configured to receive allocation information of the network resource sent by the base station, where the allocation information is configured to indicate the network resource allocated by the base station.

In this embodiment, the first terminal device is a terminal served by a cell of the base station, and the second terminal device is a terminal that utilizes the first terminal device to access the target device.

Optionally, the allocation information is sent by the base station to the first terminal device by using signaling or by broadcasting.

Optionally, the first terminal device further includes:

a second receiving unit 74, configured to receive a correspondence that is between a channel and the network resource and is sent by the base station, where the correspondence is configured to indicate a network resource used by a synchronization channel, a broadcast channel, or an access channel; and an access unit 73, configured to enable the second terminal device to access the target device according to the correspondence between the channel and the network resource.

The first receiving unit 72 and the second receiving unit 74 in this embodiment may be integrated to be used as a receiver of the first terminal device.

The sending unit 71 may be a transmitter of the first terminal device, and the access unit 73 may be a processor of the first terminal device.

Figure 8:
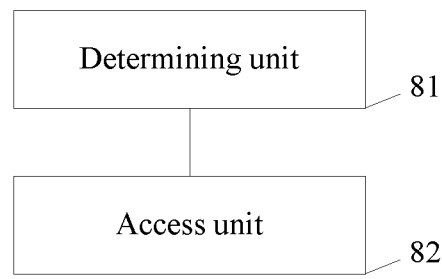
FIG. 8 is a schematic structural diagram of a second terminal device according to an embodiment of the present invention.

In still another aspect, an embodiment of the present invention provides a second terminal device, and as shown in FIG. 8, the second terminal device includes:

a determining unit 81, configured to determine a network resource used by a first terminal device, where the network resource is used by the second terminal device to access a target device in a network by using the first terminal device, the network resource is allocated by a base station, and optionally, the network resource includes a timeslot resource, a frequency resource, or a code channel resource; and an access unit 82, configured to enable the second terminal device to access the target device in the network according to the network resource by using the first terminal device.

In this embodiment, the first terminal device is a terminal of a serving cell of the base station, and the second terminal device is a terminal that utilizes the first terminal device to access the target device in a network.

Optionally, the access unit 82 is specifically configured to determine a correspondence between a channel and the network resource according to the network resource obtained by the determining unit 81, where the correspondence is configured to indicate a network resource used by a synchronization channel, a broadcast channel, or an access channel; the second terminal device accesses the target device according to the correspondence by using the first terminal device.

As an example, the determining unit 81 may specifically perform searching or detection on a network resource that may be allocated by the base station to the first terminal device, until a network resource that is actually allocated by the base station to the first terminal device is determined The access unit 82 may specifically perform channel synchronization in a synchronization channel according to the network resource actually allocated by the base station to the first terminal device, and read an access channel that is indicated in a broadcast channel and is corresponding to the network resource that is allocated by the base station and used by the first terminal device, so as to determine the correspondence between the network resource and the channel and further access the target device in the network in the access channel.

In this embodiment, the determining unit 81 may be a processor of the second terminal device, and the access unit 82 may be a receiver of the second terminal device.

In the prior art, a CF UE uses its capability to acquire, in a contention manner, a network resource that is configured to assist an AC UE in connecting to a target device in a network. Because not all network resources are scheduled and allocated by a base station, it is possible that a network resource occupied by the CF UE cannot assist the AC UE in accessing the network or the CF UE cannot occupy enough network resources to serve a second terminal device due to a relatively weak capability of the CF UE. By using the base station, the first terminal device, and the second terminal device that are provided in the embodiments of the present invention, the base station allocates, to the first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available, and which network resource can more efficiently assist the second terminal device in accessing the network. Therefore, a problem of resource waste caused by that a network resource is occupied by the CF UE by contention is avoided. Network resources are reduced and user experience of the second terminal device is improved.

Figure 9:
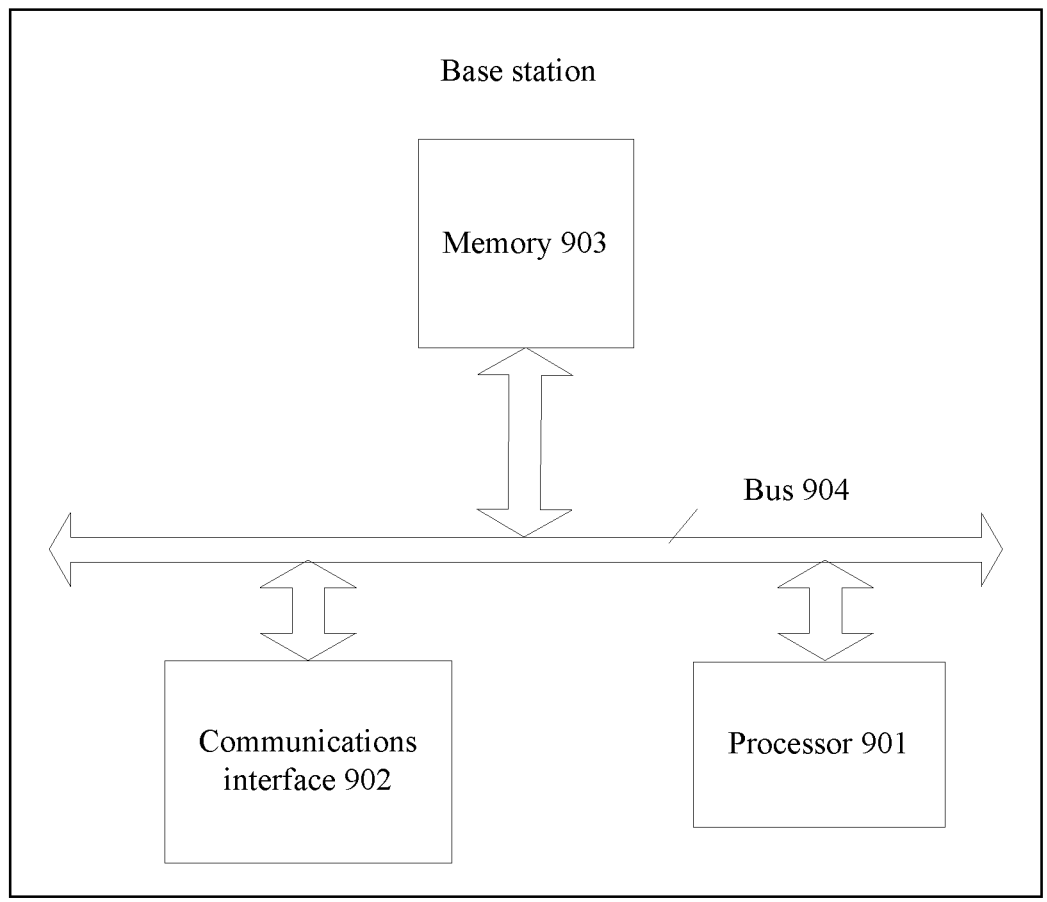
FIG. 9 is a schematic structural diagram of a base station according to an embodiment of the present invention.

In still another aspect, an embodiment of the present invention further provides a base station. FIG. 9 shows a schematic structural diagram of the base station, and the base station includes: a processor 901, a communication interface 902, a memory 903, and a bus 904. The processor 901, the communication interface 902, and the memory 903 are connected by using the bus 904. The memory 903 is configured to store computer program code, where the program code includes:

receiving request information sent by a first terminal device, where the request information is configured to request the base station to allocate a network resource, and the network resource allocated by the base station is used by a second terminal device to access a target device by using the first terminal device; and sending allocation information of the network resource to the first terminal device, where the allocation information is configured to indicate the network resource allocated by the base station, the first terminal device is a terminal of a serving cell of the base station, and the second terminal device is a terminal that utilizes the first terminal device to access the target device in a network.

The processor 901 is configured to execute the computer code stored in the memory 903.

Optionally, in the code stored in the memory 903, the sending the allocation information of the network resource to the first terminal device includes: sending the allocation information of the network resource to the first terminal device by using signaling or by broadcasting.

Optionally, the network resource allocated by the base station includes a timeslot, a frequency, or a code channel used in a case in which the second terminal device accesses the target device by using the first terminal device.

Optionally, the program code of the foregoing method further includes: determining a correspondence between a channel and the network resource according to the network resource allocated by the base station, where the correspondence is configured to indicate a network resource used by a synchronization channel, a broadcast channel, or an access channel; and sending the correspondence to the first terminal device.

The base station provided in this embodiment of the present invention may execute an action executed by a base station in the embodiments of the method for allocating a network resource. For details, refer to a description in any one of the method embodiments shown in FIGS. 2 to 5.

Figure 10:
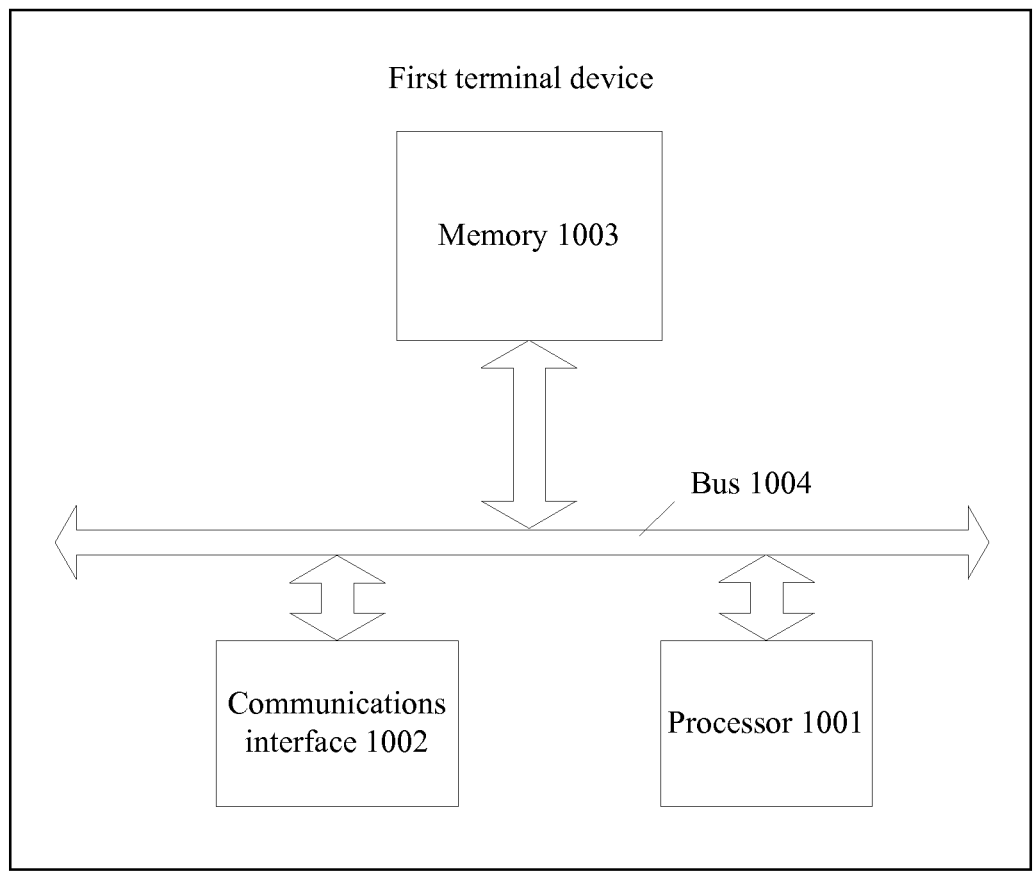
FIG. 10 is a schematic structural diagram of a first terminal device according to an embodiment of the present invention.

In still another aspect, an embodiment of the present invention further provides a first terminal device. FIG. 10 shows a schematic structural diagram of the first terminal device, and the first terminal device includes: a processor 1001, a communication interface 1002, a memory 1003, and a bus 1004. The processor 1001, the communication interface 1002, and the memory 1003 are connected by using the bus 1004. The memory 1003 is configured to store computer program code, where the computer program code includes:

sending request information to a base station, where the request information is configured to request the base station to allocate a network resource, and the network resource allocated by the base station is used by a second terminal device to access a target device by using the first terminal device; and receiving allocation information of the network resource sent by the base station, where the allocation information of the network resource is used by the first terminal device to determine the network resource, the first terminal device is a terminal of a serving cell of the base station, and the second terminal device is a terminal that utilizes the first terminal device to access the target device in a network.

The processor 1001 is configured to execute the computer program code stored in the memory 1003.

Optionally, in the computer program code stored in the memory 1003, the allocation information of the network resource is sent by the base station to the first terminal device by using signaling or by broadcasting.

Optionally, the computer program code stored in the memory 1003 may further include:

receiving, by the first terminal device, a correspondence that is between a channel and the network resource and is sent by the base station, where the correspondence between the channel and the network resource is configured to indicate a network resource used by a synchronization channel, a broadcast channel, or an access channel; and connecting, by the first terminal device, the second terminal device to the target device according to the correspondence.

Optionally, the computer program code stored in the memory 1003 may further include:

the network resource allocated by the base station includes a timeslot, a frequency, or a code channel used in a case in which the second terminal device accesses the target device by using the first terminal device.

The first terminal device provided in this embodiment of the present invention may execute an action executed by a first terminal device in the method embodiments. For details, refer to any one of the method embodiments shown in FIGS. 2 to 5.

Figure 11:
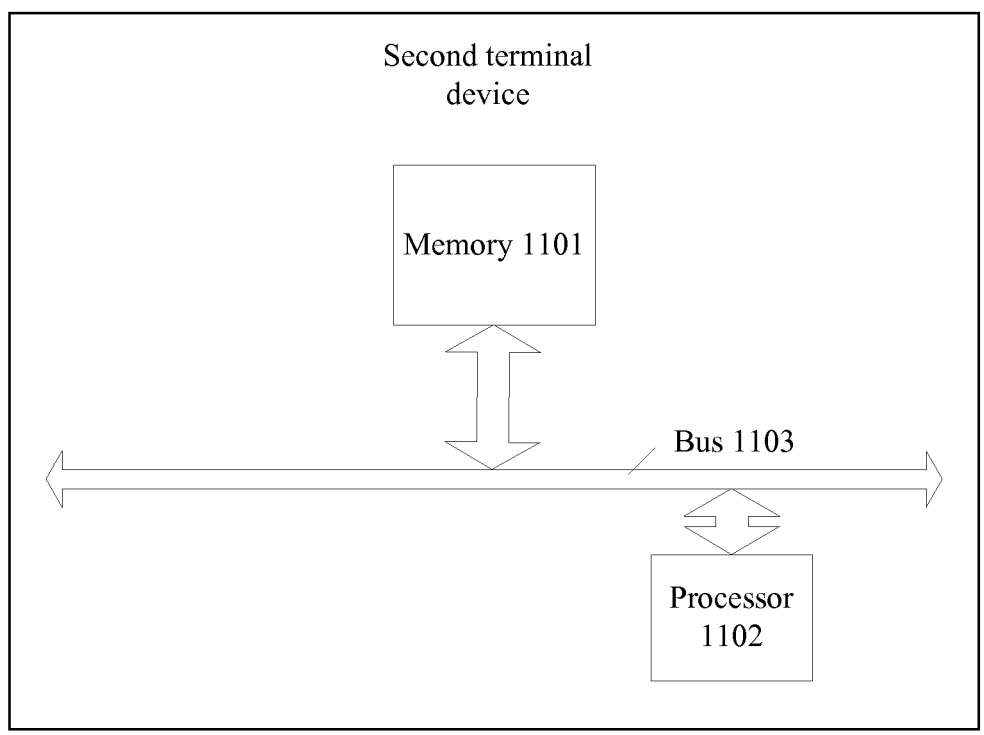
FIG. 11 is a schematic structural diagram of a second terminal device according to an embodiment of the present invention.

In still another aspect, an embodiment of the present invention further provides a second terminal device, and as shown in FIG. 11, the second terminal device includes:

a memory 1101, configured to store computer program code, where the computer program code includes:

determining a network resource used by a first terminal device, where the network resource is used by the second terminal device to access a target device in a network by using the first terminal device, and the network resource is allocated by a base station; and connecting to the target device in the network according to the network resource by using the first terminal device, where the first terminal device is a terminal of a serving cell of the base station, and the second terminal device is a terminal that utilizes the first terminal device to access the target device.

Optionally, connecting to, by the second terminal device, the target device in the network according to the network resource by using the first terminal device includes:

determining, by the second terminal device, a correspondence between a channel and the network resource according to the network resource, where the correspondence is configured to indicate a network resource used by a synchronization channel, a broadcast channel, or an access channel; and connecting to, by the second terminal device, the target device according to the correspondence between the channel and the network resource by using the first terminal device.

The second terminal device provided in this embodiment of the present invention may execute an action executed by a second terminal device in the method embodiments. For details, refer to any one of the method embodiments shown in FIG. 2 to FIG. 5.

Optionally, the second terminal device in this embodiment of the present invention may further include a bus 1103 that is configured to connect the memory 1101 and a processor 1102.

In the prior art, a CF UE uses its capability to acquire, in a contention manner, a network resource that is configured to assist an AC UE in connecting to a target device in a network. Because not all network resources are scheduled and allocated by a base station, it is possible that a network resource occupied by the CF UE cannot assist the AC UE in accessing the network or the CF UE cannot occupy enough network resources to serve a second terminal device due to a relatively weak capability of the CF UE. By using the base station, the first terminal device, and the second terminal device that are provided in the embodiments of the present invention, the base station allocates, to the first terminal device, a network resource that is configured to assist the second terminal device in connecting to the target device. The network resource is not obtained in the contention manner by the first terminal device by using its capability. Because the base station has a function of scheduling a terminal device served by the base station, the base station can easily learn which network resource is available, and which network resource can more efficiently assist the second terminal device in accessing the network. Therefore, a problem of resource waste caused by that a network resource is occupied by the CF UE by contention is avoided. Network resources are reduced and user experience of the second terminal device is improved.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for allocating a network resource, comprising:
   sending, by a first terminal device, request information to a base station, wherein the request information is configured to request the base station to allocate a network resource, and the network resource allocated by the base station is used by a second terminal device to access a target device by using the first terminal device, and the target device is another base station separate from the base station;
   receiving, by the first terminal device, allocation information of the network resource sent by the base station, wherein the allocation information is configured to indicate the network resource allocated by the base station; and
   broadcasting, by the first terminal device, the allocation information of the network resource to the second terminal device, wherein
   the first terminal device is a terminal served by a cell of the base station, and the second terminal device is a terminal not served by a cell of the base station that utilizes the first terminal device to access the target device.

2. The method for allocating a network resource according to claim 1, wherein the allocation information of the network resource allocated by the base station is sent by the base station to the first terminal device by using signaling or by broadcasting.

3. The method for allocating a network resource according to claim 1, further comprising:
   receiving, by the first terminal device, a correspondence between a channel and the network resource that is sent by the base station, wherein the correspondence is configured to indicate a network resource used by a synchronization channel, a broadcast channel, or an access channel; and
   connecting, by the first terminal device, the second terminal device to the target device according to the correspondence.

4. The method according to claim 1, wherein the network resource allocated by the base station comprises a timeslot, a frequency, or a code channel used in a case in which the second terminal device accesses the target device by using the first terminal device.

5. The method for allocating a network resource according to claim 1, wherein the target device is selected from the group consisting of a neighboring base station and a communications device in the cell of the base station.

6. The method for allocating a network resource according to claim 1, wherein before sending, by the first terminal device, request information to a base station, the method further comprises:
   receiving, by the first terminal device, a request for providing the second terminal device with a service of connecting to the target device from the second terminal device.

7. The method for allocating a network resource according to claim 1, further comprising:
   sending, by the first terminal device, an identifier of the first terminal device to the second terminal device.

8. A terminal device, comprising:
   a transmitter configured to send request information to a base station, wherein the request information is configured to request the base station to allocate a network resource, and the network resource allocated by the base station is used by a second terminal device to access a target device by using the terminal device, and the target device is another base station separate from the base station;
   a receiver configured to receive allocation information of the network resource sent by the base station, wherein the allocation information is configured to indicate the network resource allocated by the base station; and
   the transmitter configured to broadcast the allocation information of the network resource to the second terminal device, wherein
   the terminal device is a terminal served by a cell of the base station, and the second terminal device is a terminal not served by a cell of the base station that utilizes the terminal device to access the target device.

9. The terminal device according to claim 8, wherein the target device is selected from the group consisting of a neighboring base station and a communications device in the cell of the base station.

10. The terminal device according to claim 8, wherein the allocation information is sent by the base station to the terminal device by using signaling or by broadcasting.

11. The terminal device according to claim 8, wherein the receiver is further configured to:
    receive a correspondence that is between a channel and the network resource and is sent by the base station, wherein the correspondence is configured to indicate a network resource used by the synchronization channel, a broadcast channel, or an access channel; and
    the terminal further comprises a processor, configured to enable the second terminal device to access the target device according to the correspondence.

12. A method for allocating a network resource, comprising:
    receiving, by a second terminal device, allocation information of a network resource broadcast by a first terminal device, wherein the allocation information indicates the network resource is allocated by a base station, and the network resource allocated by the base station is used by the second terminal device to access a target device by using the first terminal device, and the target device is another base station separate from the base station;
    accessing, by the second terminal device, the target device by using the first terminal device, wherein
    the first terminal device is a terminal served by a cell of the base station, and the second terminal device is a terminal not served by a cell of the base station that utilizes the first terminal device to access the target device.

13. The method for allocating a network resource according to claim 12, further comprising:
    sending, by the second terminal device, a request for providing the second terminal device with a service of connecting to the target device to the first terminal device.

14. The method for allocating a network resource according to claim 12, further comprising:
    receiving, by the second terminal device, a identifier of the first terminal device from the first terminal device.

15. A second terminal device, comprising:
    a memory; and
    a processor coupled to the memory and configured to:
    receive allocation information of a network resource broadcast by a first terminal device, wherein the allocation information indicates the network resource is allocated by a base station, and the network resource allocated by the base station is used by the second terminal device to access a target device by using the first terminal device, and the target device is another base station separate from the base station; and access the target device by using the first terminal device, wherein the first terminal device is a terminal served by a cell of the base station, and the second terminal device is a terminal not served by a cell of the base station that utilizes the first terminal device to access the target device.

* * * * *